United States Patent [19]

Yu et al.

[11] 4,071,675

[45] Jan. 31, 1978

[54] EMULSION POLYMERIZATION OF VINYL CHLORIDE USING MIXED EMULSIFIER SYSTEM IN A SINGLE STEP IN THE ABSENCE OF SEED FORMATION

[75] Inventors: Arthur J. Yu, Stamford, Conn.; Donald F. Anderson, White Plains, N.Y.

[73] Assignee: Stauffer Chemical Company, Westport, Conn.

[21] Appl. No.: 774,188

[22] Filed: Mar. 3, 1977

[51] Int. Cl.$^2$ .......................... C08F 2/00; C08F 4/00; C08F 14/06

[52] U.S. Cl. .................................. 526/193; 526/88; 526/212; 526/344; 526/909

[58] Field of Search ............... 526/193, 88, 212, 344

[56] References Cited

U.S. PATENT DOCUMENTS

| 2,843,576 | 7/1958 | Dunn et al. | 526/193 |
|---|---|---|---|
| 3,293,199 | 12/1966 | Abercrombie et al. | 526/212 |
| 3,324,097 | 6/1967 | Pears | 526/206 |
| 3,383,346 | 5/1968 | Smith | 260/23 EM |
| 3,642,740 | 2/1972 | Pierce | 526/193 |
| 3,654,248 | 4/1972 | Iida et al. | 526/206 |
| 3,755,225 | 8/1973 | Pierce et al. | 260/23 EM |

FOREIGN PATENT DOCUMENTS

| 1,142,425 | 2/1969 | United Kingdom | 526/193 |

OTHER PUBLICATIONS

Ugelstad et al. "Die Makromol. Chem." 175, 507–521, (1974).
Ugelstad et al. "J. Pol Sci" Symposium No. 42, 473–485 (1973).
Azad et al. ACS Polymer Preprints, vol. 16, #1, 131–142 (Apr. 75).
Ugelstad et al. Polymer Letters J.P.Sci 11, pp. 503–513, (1973).
Azad "Emulsification & Emulsion Poly Using Cationic Surfactants & Long Chain Alcohols" Polymer Preprints, vol. 16, #1, Apr. 1975.

*Primary Examiner*—Herbert J. Lilling
*Attorney, Agent, or Firm*—Richard P. Fennelly

[57] ABSTRACT

A one-step process for the emulsion polymerization of vinyl chloride using a water-soluble initiator and an aqueous emulsifier system of (1) a $C_{12}$–$C_{18}$ straight chain alkyl or alkenyl phosphate surfactant and (2) a $C_{12}$–$C_{20}$ straight chain alkyl or alkenyl alcohol and/or a straight chain saturated hydrocarbon having a carbon content of greater than 18 is disclosed. One suitable example of a straight chain phosphate surfactant is sodium lauryl phosphate. Suitable alcohols include stearyl alcohol, cetyl alcohol and eicosanol. A suitable hydrocarbon is eicosane. The resulting homo- and copolymer latices can be used in plastisols and organosols.

9 Claims, No Drawings

EMULSION POLYMERIZATION OF VINYL CHLORIDE USING MIXED EMULSIFIER SYSTEM IN A SINGLE STEP IN THE ABSENCE OF SEED FORMATION

BACKGROUND OF THE INVENTION

1. Field of the Invention

The present invention pertains to a one-step process for the emulsion polymerization of vinyl chloride.

2. description of the Prior Art

The use of conventional straight chain surfactants, e.g., sodium lauryl sulfate, in the emulsion polymerization of vinyl chloride will generally result in the formation of very small polymer particles unless the quantity of surfactant is carefully controlled by an incremental feed technique. One common way in which larger particles of polyvinyl chloride can be obtained is by first forming a "seed" particle of the polymer in an initial polymerization procedure, followed by a second polymerization or "seed growth" step. Some recently issued U.S. patents which relate to this seed growth technique are U.S. Pat. No. 3,383,346 to E. S. Smith, U.S. Pat. No. 3,642,740 to J. K. Pierce, Jr. and U.S. Pat. No. 3,755,225 to J. K. Pierce, Jr. et al. The effect of a mixed emulsifier system of a conventional surfactant and an alcohol during only the second step of such a process has been studied in the scientific literature, J. Ugelstad et al. J. Polymer Sci., Symposium No. 42, 473–485 (1973).

In addition to the foregoing prior art, the presence of various alcohols, such as stearyl alcohol, as a component in a polymerization reaction medium has been studied by other investigators. For example, U.S. Pat. No. 3,324,097 to G. E. A. Pears and U.S. Pat. No. 3,654,248 to E. Iida et al., relate to a polymerization system wherein a homogenized vinyl chloride monomer is polymerized in the presence of an oil-soluble catalyst in a suspension polymerization procedure. When such a system is used a mixture of emulsion and suspension polymerized polyvinyl chloride particles are formed. The effect of a mixed emulsifier of surfactant and alcohol in a one-shot polymerization of styrene has also been studied: J. Ugelstad et al., Die Makromolekulare Chemie, Vol. 175, pp. 507–521 (1974); J. Ugelstad, J. Polymer Science, Polymer Letters, Vol. 11, pp. 503–513 (1973), and A. R. M. Azad et al., ACS Polymer Reprints, Vol. 16, No. 1, pp. 131–142 (April 1975).

Alkyl phosphate surfactants have been proposed as primary emulsifiers in the emulsion polymerization of vinyl chloride in a seed technique, British Pat. No. 1,142,425 to Stauffer Chemical Company. They have also been proposed as emulsifiers in emulsion polymerization procedures in conjunction with monomer-soluble initiators in order to obtain a product having a highly porous configuration in the form of aggregates, U.S. Pat. No. 2,843,576 to J. H. Dunn et al.

It has not, however, been appreciated hitherto that a one-step polymerization procedure for vinyl chloride monomer can be achieved using a water-soluble initiator and an aqueous mixed emulsifier system containing a straight chain alkyl or alkenyl phosphate surfactant.

SUMMARY OF THE PRESENT INVENTION

The present invention is a one-step emulsion polymerization process which comprises the use of an aqueous mixed emulsifier of (1) a $C_{12}$–$C_{18}$ straight chain alkyl or alkenyl phosphate surfactant, such as sodium lauryl phosphate, and (2) a $C_{12}$–$C_{20}$ straight chain alkyl or alkenyl alcohol, such as cetyl alcohol, oleyl alcohol, stearyl alcohol and eicosanol and/or a straight chain saturated hydrocarbon having a carbon content of greater than 18. The products are useful as plastisol or organosol resins.

DESCRIPTION OF THE PREFERRED EMBODIMENTS

The polymerization medium contains effective amounts for the desired polymerization of vinyl chloride monomer (and, optionally, comonomers), a water-soluble initiator, a mixed emulsifier and, if desired, a buffer.

Vinyl chloride monomer comprises at least 50%, preferably at least 85%, by weight of the entire monomeric component. Preferably, it is the sole monomer that is present. However, copolymers may be advantageously prepared in accordance with this invention. For example, copolymerizable mixtures, containing vinyl chloride and up to 49 percent vinyl acetate, but preferably in the range of 5 to 10 percent vinyl acetate, may be employed. Other monomers copolymerizable with vinyl chloride, which may be used in accordance with this invention, include: vinyl esters of other alkanoic acids, such as vinyl propionate, vinyl butyrate, and the like; the vinylidene halides, such as vinylidene chloride; vinyl esters of aromatic acids, e.g., vinyl benzoate; esters of alkenoic acids, for example, those of unsaturated mono-carboxylic acids such as methyl, acrylate, 2-ethyl hexyl acrylate, and the corresponding esters of methacrylic acid; and esters of alpha, beta-ethylenically unsaturated dicarboxylic acids, for example, the methyl, ethyl, propyl, butyl, amyl, hexyl heptyl, octyl, allyl methallyl and phenyl esters of maleic, itaconic, fumaric acids, and the like. Amides such as acrylamide and methacrylamide, and nitriles, such as acrylonitrile, may also be suitably employed. Vinyl phosphonates, such as bis(beta chloroethyl)vinylphosphonate may also be employed. The water to monomer ratio in the reaction medium can be varied widely with values of from about 1.5 to about 2.5:1, preferably from about 1.7 to about 2.0:1, being representative.

The initiator or catalyst which is used in the present invention can be any of the well-known water-soluble initiators which are used in the emulsion polymerization of vinyl chloride monomer. Oil soluble catalysts are not recommended for they yield a mixture of suspension and emulsion particles rather than the desired product which either exhibits a binodal or polydisperse particle size distribution depending on whether the mixed emulsifier is non-prehomogenized prior to use or is used as a prehomogenized addition to the reaction. Such free radical, water soluble initiators as the peroxygen type compounds ammonium persulfate, sodium perborate potassium persulfate, sodium persulfate and potassium percarbonate are illustrative of initiators that may be employed. If desired, a redox system can be used. Representative of such a system is a hydrogen peroxide initiator/ascorbic acid activator combination of a potassium persulfate/ascorbic acid combination. Combinations of persulfates and bisulfites, as for example, potassium persulfate and sodium metabisulfite can also be used. The amount of said initiator which is used should be an amount which is effective to polymerize the monomers which are present in the reaction medium. Generally, from about 0.05% to about 1%, preferably about 0.075% to about 0.10%, based on the weight of monomers, of initiators or redox system is needed.

The mixed emulsifier system of the present invention contains: (1) a $C_{12}$–$C_{18}$ straight chain alkyl or alkenyl phosphate surfactant and (2) a $C_{12}$–$C_{20}$ straight chain alkyl or alkenyl alcohol and/or saturated hydrocarbon of greater than 18 carbon atom chain length.

The $C_{12}$–$C_{18}$ straight chain phosphate surfactant which is useful in practicing the present invention has the formula

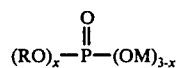

wherein R is a straight chain alkyl or alkenyl group containing from about 12 to 18 carbon atoms inclusive, M is an ammonium or alkali metal ion and X is either 1 and/or 2. Representative R groups include lauryl, tridecyl and octadecyl. Some suitable M groups include ammonium, lithium, sodium and potassium. One preferred surfactant from this class of compounds which may be used is sodium lauryl phosphate.

The $C_{12}$–$C_{20}$ straight chain alkyl or alkenyl alcohols which are to be used in the mixed emulsifier system of the present invention include such alcohols as cetyl alcohol, oleyl alcohol, stearyl alcohol and eicosanol. A representative saturated hydrocarbon having a chain length of greater than 18 carbon atoms is eicosane. Compatible mixtures of any of the forgoing second components of the mixed emulsifier can be used.

The amount of such mixed emulsifier system which is used must be sufficient to maintain a stable emulsion in the reaction environment. Use of smaller amounts than described herein will result in coagulation of the latex, whereas use of larger amounts will result in undesirable contamination of the product without providing any other significant benefit. The weight ratio of surfactant to alcohol in the mixture can range anywhere from about 0.8:1 to about 1:4, preferably from about 0.8:1 to about 1:2 in order to produce the desired product of the present invention having the desirable physical properties associated with the present invention. The amount of mixed emulsifier to vinyl chloride monomer (optionally in the presence of the copolymerizable monomers) is from about 0.7 to about 3%, preferably 0.8% to about 2%, by weight of all such copolymerizable monomers.

The presence of a suitable buffer, e.g., borax, in order to maintain the reaction medium at a pH of from about 5 to about 8, preferably from about 6 to about 7.5, is highly desirable since it will insure production of a polydisperse distribution of resin particles generally larger than obtainable with a straight surfactant system.

If desired, the mixture of phosphate surfactant and alcohol and/or hydrocarbon can be prehomogenized prior to use in the polymerization reaction in order to achieve a more reproducible product having a more uniform particle size distribution for the particles which result. In such a technique the two components of the mixed emulsifier are first prehomogenized by subjecting them to agitation in water when they are both in the liquid state in any suitable agitation apparatus until a visually homogeneous mixture is formed. The mixture of the two components may have to be heated if one or both of the selected components is a solid at ambient temperature to above the melting point of each component or components. The monomeric reactants and initiator can then be added for the polymerization reaction.

The polymerization process of the present invention is conducted by heating the reaction mixture to a temperature of from about 45° to about 70° C. for about 3 hrs. to about 5 hrs.

The foregoing invention is illustrated by the Examples which follow:

EXAMPLE 1

This Example illustrates preparation of the mixed emulsifier which was used in the polymerization process of this invention.

Lauryl acid phosphate (3 gm. of this phosphate required 4.5 gm. of 10% NaOH for adjustment to a pH of 8.0) was used in order to prepare the sodium lauryl phosphate salt by mixing the following ingredients and heating them to 70° C.:

| Ingredient | Amount (in gm.) |
| --- | --- |
| Deionized water | 2520 |
| Sodium hydroxide (97%) | 23.3 |
| Lauryl acid phosphate | 150.0 g. |

From this resulting solution a series of stearyl alcohol/sodium lauryl phosphate mixed emulsifiers were prepared for use in later Examples.

EXAMPLE 2

This Example illustrates the use of a sodium lauryl phosphate/stearyl alcohol mixed emulsifier (abbreviated "SLP/SA" hereinafter) in the one-shot polymerization of vinyl chloride monomer. The reaction was run in bottles at a temperature of 54° C. for 4 hours. The Table given below sets forth the reactants that were used and the results that were obtained.

| Ingredient | RUN NUMBER | | | | | | | | | | | |
| --- | --- | --- | --- | --- | --- | --- | --- | --- | --- | --- | --- | --- |
| | 1 | 2 | 3 | 4 | 5 | 6 | 7 | 8 | 9 | 10 | 11 | 12 |
| Vinyl chloride monomer | 150 | 150 | 150 | 150 | 150 | 150 | 150 | 150 | 150 | 150 | 150 | 150 |
| SLP/SA (1:0.5)* | 100 | 125 | 150 | — | — | — | — | — | — | — | — | — |
| SLP/SA (1:1)* | — | — | — | 100 | 125 | 150 | — | — | — | — | — | — |
| SLP/SA (1:2)* | — | — | — | — | — | — | 100 | 125 | 150 | — | — | — |
| SLP alone | — | — | — | — | — | — | — | — | — | 15 | 15 | 15 |
| Sodium bicarbonate (1%, by weight, aq. soln.) | 20 | 20 | 20 | 20 | 20 | 20 | 20 | 20 | 20 | 20 | 20 | 20 |
| Sodium persulfate (1%, by weight, soln.) | 54 | 54 | 54 | 54 | 54 | 54 | 54 | 54 | 54 | 54 | 54 | 54 |
| Deionized Water | 50 | 25 | — | 50 | 25 | — | 50 | 25 | — | 136 | 136 | 136 |
| Coagulum (wt. in gm)[1] | 7.3 | 10.4 | 12.4 | 8.4 | 9.0 | 10.9 | 10.7 | 13.6 | 15.4 | 5.2 | 9.2 | 8. |
| Mechan. Stability (in sec.)[2] | 65 | 90 | 108 | 32 | 74 | 85 | 25 | 4 | 66 | 8.5 | — | — |
| pH of latex | 7.8 | 7.85 | 8.0 | 7.7 | 7.85 | 7.15 | — | — | — | — | — | — |
| Particle Size Range | — | — | 0.08 | — | — | 0.01– | — | — | 0.12– | — | — | — |

| Ingredient | RUN NUMBER | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| (microns) | | | 0.05 | | | 0.87 | | | 0.34 | | | |

Footnotes:
*The figures in parentheses indicate the weight ratio of sodium lauryl phosphate to stearyl alcohol.
[1] The amount of dry coagulum is based on the weight of the monomer charge. Lower amounts of coagulum are desirable since coagulum adversely affects commercial operations.
[2] The mechanical stability is measured by agitating the product latex in a Hamilton Beach laboratory mixer set at low speed. The time required to coagulate the product in the mixer is determined by visual inspection. This test gives a measure of the time required for a latex to coagulate or setup. Higher times are more desirable. Coagulation adversely affects the case with which latex can be pumped in commercial production environments.

What is claimed:

1. In an emulsion polymerization procedure for forming vinyl chloride polymers by heating a monomer charge containing at least 50%, by weight, vinyl chloride in the presence of a water soluble initiator and an emulsifier, wherein the improvement comprises using as an emulsifier an effective amount to maintain a stable emulsion of a mixture of: (1) at least one $C_{12}$-$C_{18}$ straight chain phosphate surfactant of the formula $$(RO)_x-\overset{O}{\underset{\|}{P}}-(OM)_{3-x}$$

wherein R is a straight chain alkyl or alkenyl group containing from about 12 to about 18 carbon atoms inclusive, M is an ammonium or alkali metal ion and x is 1 and/or 2 and (2) at least one $C_{12}$-$C_{20}$ straight chain alkyl or alkenyl alcohol or saturated hydrocarbon having a chain of greater than 18 carbon atoms to effect information of the polymers in a single step in the absence of the initial introduction of seed particles.

2. A process as claimed in claim 1 wherein the phosphate surfactant is sodium lauryl phosphate.

3. A process as claimed in claim 1 wherein the straight chain alkyl alcohol is stearyl alcohol.

4. A process as claimed in claim 1 wherein the amount of the emulsifier mixture which is present from about 0.7% to about 3%, by weight, based on the amount of polymerizable monomers.

5. A process as claimed in claim 1 wherein the weight ratio of surfactant to alcohol in the mixture ranges from about 1:1 to about 1:4.

6. A process as claimed in claim 1 wherein the surfactant is sodium lauryl phosphate and the alcohol is stearyl alcohol.

7. A process as claimed in claim 6 wherein the combined amount of surfactant and alcohol ranges from about 0.8% to about 2.0% by weight of the polymerizable monomers.

8. A process as claimed in claim 6 wherein the weight ratio of surfactant to alcohol ranges from about 0.8:1 to about 1:4.

9. A process as claimed in claim 1 wherein the phosphate surfactant and alcohol or hydrocarbon are prehomogenized prior to use in the polymerization procedure.

* * * * *